March 12, 1940.   V. M. EXNER   2,193,229

BUMPER

Filed Feb. 2, 1938

Inventor
Virgil M. Exner
By Blackmore, Spencer & Flint
Attorneys

Patented Mar. 12, 1940

2,193,229

UNITED STATES PATENT OFFICE 2,193,229

BUMPER

Virgil M. Exner, Detroit, Mich., assignor to General Motors Corporation, Detroit, Mich., a corporation of Delaware Application February 2, 1938, Serial No. 188,250

3 Claims. (Cl. 293—55)

This invention relates to motor vehicles and more particularly to an improved end construction. As applied to the conventional automobile having a forwardly mounted power plant, the invention involves the intake of engine cooling air through the front bumper with the engine and its appurtenances completely covered and hidden from observation.

An object of the invention is to enhance the general appearance of the vehicle, especially as viewed from the front end and to enlarge the scope of design and contour treatment by the introduction of the cooling air supply at an inconspicuous inlet and otherwise housing the engine compartment, thereby eliminating the customary ornamental and costly radiator grille.

A further object is to provide an improved bumper construction which gives a wide range of protection in the event of collision and which incorporates as a structural part thereof a hollow rearwardly extending portion affording an air duct and merging into the surface contour of the vehicle in telescopic relation to the engine hood for movement under impact.

Figure 1:
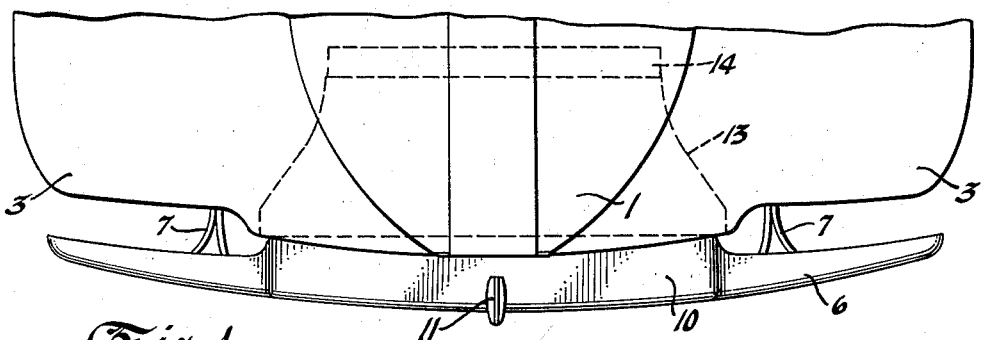
Figure 2:
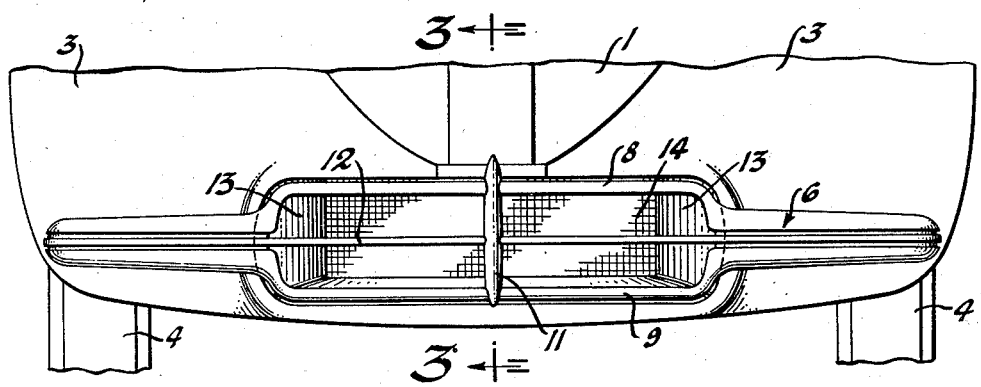
Figure 3:
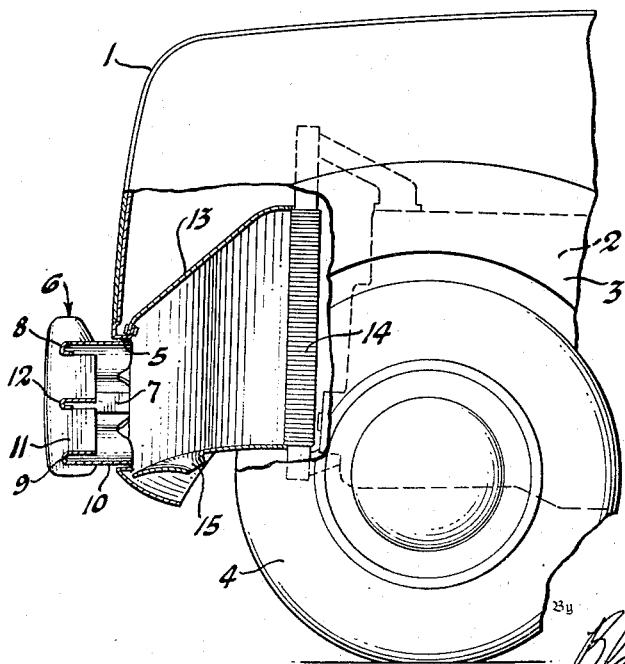

For a detailed explanation of the invention reference will be made to the accompanying drawing wherein Figure 1 is a top plan view of the front portion of an automobile embodying the invention; Figure 2 is a front elevation of the vehicle and Figure 3 is a longitudinal sectional view taken substantially on line 3—3 of Figure 2.

The sheet metal at the front of the vehicle may include a hood or bonnet 1 of pleasing contour which houses the engine or power plant 2 and a pair of fenders 3—3 on opposite sides of the hood for the front wheels 4—4. The sheet metal may be assembled in any suitable cooperative relation but in any event it is provided in the forward bottom portion with a transversely elongated opening defined by a rearwardly extending flange 5. Forwardly of such opening and in concealing relation thereto is the bumper assembly 6 supported from the vehicle in the usual fashion as by the arms 7—7 as seen in Figure 1. The bumper assembly may be rigid in relation to the vehicle but preferably it incorporates some flexibility or resiliency so that it can yield or move under impact to cushion shock.

The opposite end portions of the bumper extend forwardly of the fenders 3—3 in protective relation thereto while the central portion of the bumper in line with the opening defined by the flange 5 is enlarged somewhat and the central portion is open for the intake of air. This opening may, if desired, incorporate as a part of the bumper assembly, suitable grille work (not shown) for appearance purposes, and it is located within limits defined by the spaced upper and lower rails 8 and 9, which rails preferably include rearward extensions cooperating to form a sleeve or passageway 10 telescopically fitted to the flange 5 for conveying air under the hood. For some installations, the telescopic sleeve can be omitted, but preferably the spaced apart openings in the bumper and hood should be aligned with each other in the direction of air flow. For mutual reinforcement of the rails 8 and 9, one or more vertically disposed tie bars 11 extend between and connect the rails. This tie bar or clamp plate may comprise a sheet metal pressing or the like having slots entering from its rearward edge which receive the forward portions of the rails 8 and 9. In addition, an ornamental rail 12 is shown bisecting the bumper opening and extending in parallelism to the bars 8 and 9 so as to avoid the possible unsightliness of a large opening and remove any semblance of a wide gap.

To convey the air taken in at the bumper to its point of use a duct or tunnel may be mounted under the hood as shown at 13. In the illustrated embodiment this tunnel 13 leads air to the radiator 14 which forms a part of the conventional liquid circulating system for cooling the engine. The proportion of parts is such that the area of the intake opening substantially corresponds with the cross sectional dimension of the tunnel from front to rear and with the area of the air spaces through the radiator core 14. Accordingly the side walls of the tunnel 13, as shown in Figure 1, are forwardly flared or outwardly divergent while the top and bottom walls converge forwardly, as shown in Figure 3, with the top wall extending at an inclined angle between the top of the core and the top of the inlet opening which is in a plane considerably below the top of the radiator core. It may be here pointed out that the air intake through the bumper places it in a most efficient location and at the highest pressure area of the front end of a motor car. To enable the escape of any water that may be splashed and carried through the inlet opening in the bumper the lower wall of the tunnel 13 may be provided with a drain opening as shown at 15.

While the preferred embodiment has been described as to its specific construction it will be understood that various modifications may be made within the scope of the invention as defined by the appended claims.

I claim:

1. A motor vehicle having a transversely elongated air entrance opening in the front wall of the engine hood in forwardly spaced relation to a radiator and being characterized by a conduit member leading from the opening to the front face of the radiator and having top and bottom walls and a pair of side walls, said side walls extending rearwardly in convergent relation and said top and bottom walls extending rearwardly in divergent relation, in compensation for the convergent relation of the side walls.

2. A vehicle front end construction having an imperforate front wall portion of an engine bonnet spaced forwardly of the engine cooling radiator and projected upwardly above a bumper in which is contained an air intake opening and being characterized by an air conduit member suspended in the space between the radiator and front wall portion in alignment with the intake opening for delivering air rearwardly to the front face of the radiator, and a splash drain in the bottom wall of said conduit member for the escape of water entering the conduit member.

3. A vehicle front end construction including a radiator, a forwardly positioned bumper in a plane below the top of the radiator, an engine hood having an imperforate front wall portion throughout the region ahead of the radiator and above the bumper, an air intake conduit projected rearwardly from the bumper and behind said wall and an air tunnel receiving the rear end of the conduit and projecting under the hood to the front face of the radiator.

VIRGIL M. EXNER.